Patented Aug. 7, 1945

2,381,706

UNITED STATES PATENT OFFICE 2,381,706

MANUFACTURE OF SPONGE RUBBER

Clarence Walter Wilson, Norco, Calif., assignor to California Fruit Growers Exchange, Los Angeles, Calif., a corporation of California No Drawing. Application February 16, 1942, Serial No. 431,103

4 Claims. (Cl. 260—723)

This invention has to do with sponge rubber manufacture, and is particularly directed to a process for making sponge rubber and to the product so made.

Sponge rubber is of at least two varieties. One variety contains intercommunicating cells and may be used as a substitute for natural sponge, whence the name "sponge rubber." A second kind has cells which are mostly not in communication with one another. Both may be used in various applications where advantage is taken of their elastic qualities. The process which is the subject of this invention is designed to give a sponge of the first type above described.

An object of my invention is to provide a process for producing a superior rubber sponge or cellular rubber material.

Another object is to prepare sponge rubber from aqueous dispersions of rubber, such as latex or artificial rubber emulsions.

A further object is to provide a sponge rubber product in an inexpensive and expeditious manner.

The process which I have invented involves coagulation and vulcanization of a rubber dispersion around fragments of a gel which may be then removed from the sponge. The gel fragments act to maintain voids or cells in the mass until the rubber has attained a state of solidity such that it will not collapse. After solidification of the sponge, the gel fragments are squeezed out, rupturing the cell walls and leaving unobjectionable quantities of gel solids in the mass.

The gels which I have found satisfactory in this process are gels formed by the use of metal pectates, which pectates may be produced from pectinous source materials by an alkaline treatment, as fully disclosed in my U. S. Patent No. Re. 21,077. Particularly, insoluble alkaline earth pectate gels are employed, as disclosed by specific examples of my process. The patent referred to describes the preparation of fibrous alkali metal and ammonium pectates. These pectates are soluble in water. From them can be formed insoluble pectates of alkaline earth and other polyvalent metals. Under suitable conditions the insoluble pectates are precipitated as gels, and it is these gels which I use for the preparation of cellular rubber materials. Aluminum and calcium gels are especially desirable, while copper would not ordinarily be used, since it may damage the rubber.

The making of pectate gels is to be accomplished in known manner. Ordinarily it is desirable to have the pectate in solution before addition of the gelatinizing cation, but it is perfectly feasible to use a mixture which contains a peptizing agent for the pectate, even in the presence of such cations.

As one example of the practice of my invention, a gel was made as follows:

| | |
|---|---|
| Sodium pectate_____grams__ | 700 |
| CaHPO₄ _____do____ | 50 |
| Water _____liters__ | 100 |
| Acetic anhydride _____milliliters__ | 800 |

The sodium pectate and the CaHPO₄ were well stirred into the water. The sodium pectate hydrated and passed into the solution, the calcium acid phosphate remaining in suspension. Then the acetic anhydride was added and the particles of calcium acid phosphate were seen to disappear. Thereupon a gel formed throughout the whole mass. This required about one-half hour. The chemical mechanism of this system would clearly appear to be that the acetic anhydride reacts with the water to give acetic acid, which then produces an acidic medium in which the calcium acid phosphate is soluble. As soon as the calcium ions pass into solution they begin to react with the sodium pectate to precipitate the calcium pectate as a gel, which under these conditions, of course, will extend throughout and will gelatinize the entire mass.

The gel was then broken into small particles by being twice forced through a 20-mesh screen. To a normal latex was added a vulcanizing compound, C-95, in the proportions:

| | Liters |
|---|---|
| Latex _____ | 100 |
| C-95 _____ | 10 |

The composition of C-95 is as follows:

| | Parts by weight |
|---|---|
| Zinc oxide _____ | 2.0 |
| Sulfur (dry) _____ | 0.6 |
| AgeRite White (symmetrical dibetanaphthylparaphenyldiamine) _____ | 1.0 |
| Butyl zimate _____ | 1.0 |
| Latex telloy _____ | 0.5 |
| Darvan _____ | 0.2 |
| Casein _____ | 0.15 |
| Caustic soda _____ | 0.1 |
| Water _____ | 4.65 |
| Total _____ | 10.20 |

Fifteen liters of this latex composition were mixed with 20 kg. of the gel fragments. The mixture was poured into forms which were heated for coagulation and vulcanization. When the sponge was properly cured, it was pressed to remove liquid, washed and dried. The sponge was quite strong, strength increasing slightly over a period of several hours. Voids were well distributed, and in general the desired characteristics of this type of product were present.

To illustrate one of several possible variations, a like batch was made, using 1 liter of 5 N acetic acid with the latex-gel mixture. The acetic acid caused prompt coagulation. The coagulum was cured at 180° F. for two hours, pressed, washed, and dried. The sponge was similar to the one just described.

Obviously, relative proportions of latex and gel fragments may be widely varied, depending upon the relative volume of voids desired in the finished sponge, and also depending on the concentration of rubber solids in the latex or emulsion used.

Pectate gels exhibit syneresis under conditions similar to those obtaining when the sponge is treated as described above. Syneresis of the gel fragments is delayed long enough after admixture with the latex or rubber emulsion compound to allow the sponge to set, and the cells are found to retain the shapes of the gel fragments. During vulcanization, syneresis frees most of the water from the gel in the individual cells. This has the advantage of freeing the cell walls of most or all of the gel structure. The water plus most of the gel solids are removed on pressing the sponge. As may be noted on consideration of the above examples, the insoluble solids content of the gels is on the order of one-half to one per cent by weight. Thus there is only a very small residue which may sometimes remain after expressing and washing the sponge rubber.

While natural latex is described in the examples given, other and artificial rubber emulsions may be used, as may concentrated and/or vulcanized latex. Many of the fillers and compounding agents used in the rubber art may be added if desired. Various coagulating and/or vulcanizing compounds may be used. Cold vulcanization is also possible, in known manner.

Characteristics of the sponge may be varied by variations in the shapes and sizes of the gel fragments, and in the latex composition used. For example, long, thread-like gel particles may be oriented crosswise of a thin layer and thus produce what may be called a foraminous rubber layer. Increased rubber content will give sponge of greater strength. The sponge may be formed and the desired shapes obtained by cutting, or the unsolidified mass may be molded into any form by coagulation and/or vulcanization in properly shaped molds.

Other gels may be used in the manner I have described, but do not offer the advantages inherent in the use of pectate gels. Most gels require more solids content. This is true of gelatin and pectin gels, for example. Higher solids content results in greater residues in the sponge product. Also the residues are apt to undergo chemical changes giving rise to foul odors, and may, in addition, cause deterioration of the rubber. Pectates are cheap and readily available gel forming substances.

Instead of using the purified pectates, the pectated pulp described in Patent No. Re. 21,077 may be used to form the gels. The insoluble materials (for example, cellulose) are unobjectionable in certain uses of the sponge, and since the pulp offers even greater economy than the pure products, its use is often advantageous.

Pectates of the non-fibrous type may also be used, and offer some of the advantages of the fibrous ones. Soluble pectates of alkaline organic bases also are suitable.

Having described my invention, I claim:

1. A method for the manufacture of sponge rubber which comprises, mixing with an aqueous rubber dispersion fragments of a gel in which the gelling agent is a water-insoluble aluminum pectate, said gel containing said water-insoluble gelling agent in a proportion on the order of one-half to one per cent by weight, molding and heat vulcanizing the mass, whereafter the water of the gel is removed, thereby leaving a cellular rubber structure.

2. A method for the manufacture of sponge rubber which comprises, mixing with an aqueous rubber dispersion fragments of a gel in which the gelling agent is a water-insoluble alkaline earth metal pectate, said gel containing said water-insoluble gelling agent in a proportion on the order of one-half to one per cent by weight, molding and heat vulcanizing the mass, whereafter the water of the gel is removed, thereby leaving a cellular rubber structure.

3. A method for the manufacture of sponge rubber which comprises mixing, with an aqueous rubber dispersion fragments of a gel in which the gelling agent is a water-insoluble calcium pectate, said gel containing said water-insoluble gelling agent in a proportion on the order of one-half to one per cent by weight, molding and heat vulcanizing the mass, whereafter the water of the gel is removed, thereby leaving a cellular rubber structure.

4. A method for the manufacture of sponge rubber which comprises mixing with an aqueous rubber dispersion, fragments of a gel in which the gelling agent is a water-insoluble metal pectate from the class consisting of aluminum pectate and alkaline earth metal pectates, said gel containing said water-insoluble gelling agent in a proportion on the order of one-half to one percent by weight, molding and heat vulcanizing the mass, whereafter the water of the gel is removed, thereby leaving a cellulas rubber structure.

CLARENCE WALTER WILSON.